(12) United States Patent
Klochkoff et al.

(10) Patent No.: US 8,628,670 B2
(45) Date of Patent: Jan. 14, 2014

(54) WATER TREATMENT APPARATUS AND PROCESS TO REDUCE PIPE SCALE AND BIOMASS

(75) Inventors: Eugene Klochkoff, Hicksville, NY (US); Clive Ling, Hewlett, NY (US); Steven Lerman, Plainview, NY (US)

(73) Assignee: Cascade Water Services, Hicksville, NY (US)

( * ) Notice: Subject to any disclaimer, the term of this patent is extended or adjusted under 35 U.S.C. 154(b) by 789 days.

(21) Appl. No.: 12/804,295

(22) Filed: Jul. 19, 2010

(65) Prior Publication Data

US 2012/0012536 A1    Jan. 19, 2012

(51) Int. Cl.
- C02F 1/32 (2006.01)
- C02F 1/72 (2006.01)
- B01D 35/14 (2006.01)

(52) U.S. Cl.
USPC .............. 210/748.01; 210/748.1; 210/748.11; 210/748.12; 210/90; 210/97; 210/101; 210/192; 210/739; 422/24; 422/186; 422/186.3

(58) Field of Classification Search
USPC ......... 210/748.01, 748.1, 748.11, 748.12, 90, 210/97, 101, 192, 739; 422/24, 186.3
See application file for complete search history.

(56) References Cited

U.S. PATENT DOCUMENTS

| | | |
|---|---|---|
| 1,435,192 A | 11/1922 | Anderson |
| 2,295,046 A | 8/1940 | Noel |
| 2,443,429 A | 6/1948 | Marks et al. |
| 3,186,929 A | 6/1965 | Rippie |
| 3,336,099 A | 8/1967 | Czulak et al. |
| 3,603,827 A | 9/1971 | Degawa et al. |
| 3,659,096 A | 4/1972 | Kompanek |
| 3,665,235 A | 5/1972 | Hugot |
| 4,008,136 A | 2/1977 | Williams |
| 4,033,719 A | 7/1977 | Conn et al. |
| 4,090,960 A | 5/1978 | Cooper |
| 4,101,424 A | 7/1978 | Schooley et al. |
| 4,141,830 A | 2/1979 | Last |
| 4,179,616 A | 12/1979 | Coviello et al. |
| 4,214,962 A | 7/1980 | Pincon |
| 4,229,389 A | 10/1980 | Granger |
| 4,230,571 A | 10/1980 | Dadd |
| 4,255,257 A | 3/1981 | Greiner et al. |
| 4,255,383 A | 3/1981 | Schenk |
| 4,259,269 A | 3/1981 | Flowers |
| 4,297,222 A | 10/1981 | Takeguchi et al. |
| 4,338,199 A | 7/1982 | Modell |
| 4,372,860 A | 2/1983 | Kaas |
| 4,563,286 A | 1/1986 | Johnson et al. |

(Continued)

Primary Examiner — Joseph Drodge
Assistant Examiner — Cameron J Allen
(74) Attorney, Agent, or Firm — John F. Vodopia

(57) ABSTRACT

A method of treating water in order to minimize scaling and biomass buildup in water conduits or containers in which the treated water is used includes processing ambient air in a chamber including at least one ultraviolet light source to generate an output flow mixture of air and reactive oxygen species (ROS) gasses, controlling the at least one ultraviolet light source, a flow rate of the output flow mixture and an ROS gas ratio in the output flow mixture, mixing a water flow with the output flow mixture to realize a flow of water/ROS gas mixture and outputting the flow of water/ROS gas mixture as the treated water. Preferably, the processing includes generating reactive oxygen species (ROS) gasses in the output flow mixture including at least one of Super Oxide ($O_2^-$) Peroxide ($—O_2—$), Hydroperoxide ($HO_2^-$), Hydroxyl Radicals ($OH·$), Ozone ($O_3^-$) and Molecular Oxygen ($O_2$).

19 Claims, 4 Drawing Sheets

(56) References Cited

U.S. PATENT DOCUMENTS

| | | |
|---|---|---|
| 4,655,933 A | 4/1987 | Johnson et al. |
| 4,752,401 A | 6/1988 | Bodenstein |
| 5,266,216 A | 11/1993 | Agueda et al. |
| 5,424,032 A | 6/1995 | Christenson et al. |
| 5,443,719 A | 8/1995 | Johnson et al. |
| 5,536,400 A * | 7/1996 | Schultz .................... 210/192 |
| 5,597,479 A | 1/1997 | Johnson |
| 5,616,250 A | 4/1997 | Johnson et al. |
| 5,622,622 A | 4/1997 | Johnson |
| 5,635,059 A | 6/1997 | Johnson |
| 5,685,994 A | 11/1997 | Johnson |
| 5,738,780 A * | 4/1998 | Markham .................... 210/143 |
| 6,517,713 B2 | 2/2003 | Gargas |
| 6,740,245 B2 | 5/2004 | Johnson |
| 6,923,901 B2 | 8/2005 | Leffler et al. |
| 7,160,448 B2 | 1/2007 | Johnson |
| 2004/0120845 A1* | 6/2004 | Potember et al. ................. 422/4 |
| 2004/0140269 A1* | 7/2004 | Chang .......................... 210/748 |
| 2006/0144690 A1* | 7/2006 | Fink et al. ................. 204/157.5 |
| 2007/0151905 A1* | 7/2007 | Wang et al. ..................... 210/97 |

* cited by examiner

WATER TREATMENT APPARATUS AND PROCESS TO REDUCE PIPE SCALE AND BIOMASS

BACKGROUND OF THE INVENTION

This invention is an apparatus and process used to reduce the occurrence of scale and biomass formation in water systems or aqueous systems.

The cause of scaling within water pipes is a gradual buildup of dense and adherent calcium carbonate deposits. Calcium carbonate formation or precipitation starts with carbon dioxide in air. It is one of the most common natural gases derived from respiration, fuel emission and photosynthesis. When it dissolves in water (rain or moisture), it forms weak carbonic acid. Carbonic acid in rain and ground water dissolves lime stone sedimentary rock (calcium carbonate) to form calcium bicarbonate. Calcium bicarbonate is a soluble form of calcium carbonate. Its formation occurs at neutral pH (6 and 8). The reason that calcium carbonate is important in water treatment is that it has a very low solubility, and its solubility decreases with an increase in temperature. All water cooled heat transfer equipment is vulnerable to calcium carbonate fouling or deposition due to lower calcium carbonate solubility on the heat transfer surface than in the cooler bulk water.

When calcium carbonate crystallizes on a heated surface, the crystals line up to form a structure similar to a brick wall, and it is dense and impervious to heat transfer. Its poor thermal conductivity impedes heat transfer, which causes a waste in energy and creates a potential danger of boiler tube overheat and the possibility of a compressor shut-down in air-conditioning equipment. When crystals line up in an orderly manner as previously described, they form rocklike, rigid, dense structures. Certain structures are denser and more adherent than others. In the case of calcium carbonate formed on heat transfer surfaces, the structure is primarily in the form of calcite with a small amount of aragonite. There is a third uncommon type formed, vaterite, which is hexagonal in molecular structure.

SUMMARY OF THE INVENTION

The inventive process and apparatus reduce and/or overcome the problem of scaling and biomass buildup in systems including water storage and water piping apparatus, such as HVAC, process water and recreational water systems, e.g., boiler, cooling tower systems, decorative fountain systems, etc.

The inventive process and apparatus generate a mixture of "Reactive Oxygen Species" (ROS) gases mixed with water that result in the reduction of the calcium carbonate via formation of less adherent calcium carbonate. The less adherent calcium carbonate is more effectively flushed out from the inside of the piping within which the water mixed with the ROS gases is piped. The crystal structure of aragonite calcium carbonate is more efficiently motivated for removal than the crystal structure of calcite calcium carbonate. The cause of biomass within piping and other water carrying systems is high bacteria growth which can be reduced by use of water mixed with the ROS gases, generated by the inventive process and apparatus as described.

Ambient air is circulated into a chamber included in the apparatus where exposed to ultraviolet radiation to generate the ROS gas as a component of the air. Water is circulated into the apparatus and combined with a mixture of various gaseous forms of oxygen generated by the exposure of the ambient air to the ultraviolet radiation. This water/air mixture contains ROS gas. The resultant outflow of water mixed with the ROS gas so conditioned provides for a reduction of scale and biomass formation that sanitizes and improves heat transfer in downstream piping where this water flows. This reduction in scale and biomass formation minimizes service work such as cleaning and de-scaling in applications such as HVAC systems, fountains and other applications where there is a flow of water through piping.

In an embodiment, the invention provides a water treatment apparatus for generating treated water that minimizes scaling in water conduits or containers in which the treated water is used. The apparatus comprises a chamber including at least one ultraviolet light source for processing ambient air to generate an output flow mixture of air and reactive oxygen species (ROS) gasses, a controller for controlling the at least one ultraviolet lamp, a flow rate of the output flow mixture and an ROS gas ratio in the output flow mixture and an eductor for mixing a water flow with the output flow mixture to realize a water/ROS gas mixture that is output as the treated water. Preferably, the chamber further comprises copper to catalyze the processing of the ambient air to generate the output flow mixture.

In another embodiment, the invention provides an HVAC system including a water supply inlet and water treatment apparatus for generating treated water that minimizes scaling in fluid communication with said water supply inlet. The water treatment apparatus comprises a chamber including at least one ultraviolet light source for processing ambient air to generate an output flow mixture of air and reactive oxygen species (ROS) gasses, a controller for controlling the at least one ultraviolet light source, a flow rate of the output flow mixture and an ROS gas ratio in the output flow mixture and an eductor for mixing a water flow with the output flow mixture to realize a water/ROS gas mixture that is output as the treated water. The HVAC system including the water treatment apparatus may be as an open cooling tower system, a closed heating and cooling system for use in commercial, industrial and residential buildings and dwellings and in industrial and commercial electrical power generation.

In another embodiment, the invention provides a method of treating water that minimizes scaling in water conduits or containers in which the treated water is used. The method requires processing ambient air in a chamber including at least one ultraviolet light source to generate an output flow mixture of air and reactive oxygen species (ROS) gasses, controlling the at least one ultraviolet light source, a flow rate of the output flow mixture and an ROS gas ratio in the output flow mixture, mixing a water flow with the output flow mixture to realize a flow of water/ROS gas mixture and outputting the flow of water/ROS gas mixture as the treated water. The processing includes generating reactive oxygen species (ROS) gasses in the output flow mixture including at least one of Super Oxide ($O_2^-$) Peroxide ($—O_2—$), Hydroperoxide ($HO_2^-$), Hydroxyl Radicals ($OH^.$), Ozone ($O_3^-$) and Molecular Oxygen ($O_2$).

DESCRIPTION OF THE DRAWINGS

The present invention can best be understood in connection with the accompanying drawings. It is noted that the invention is not limited to the precise embodiments shown in drawings, in which:

FIG. 4A depicts a planar view of one of disks 17, for placement on the ends 18 of chamber 2.

DETAILED DESCRIPTION OF THE INVENTION

The following is a detailed description of example embodiments of the invention depicted in the accompanying drawings. The example embodiments are in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

The process for this generation of the water and ROS gas mixture is best illustrated by a description of an example embodiment of the apparatus necessary to conduct the process, which are shown in FIGS. 1-4A and described hereinbelow.

Figure 1:
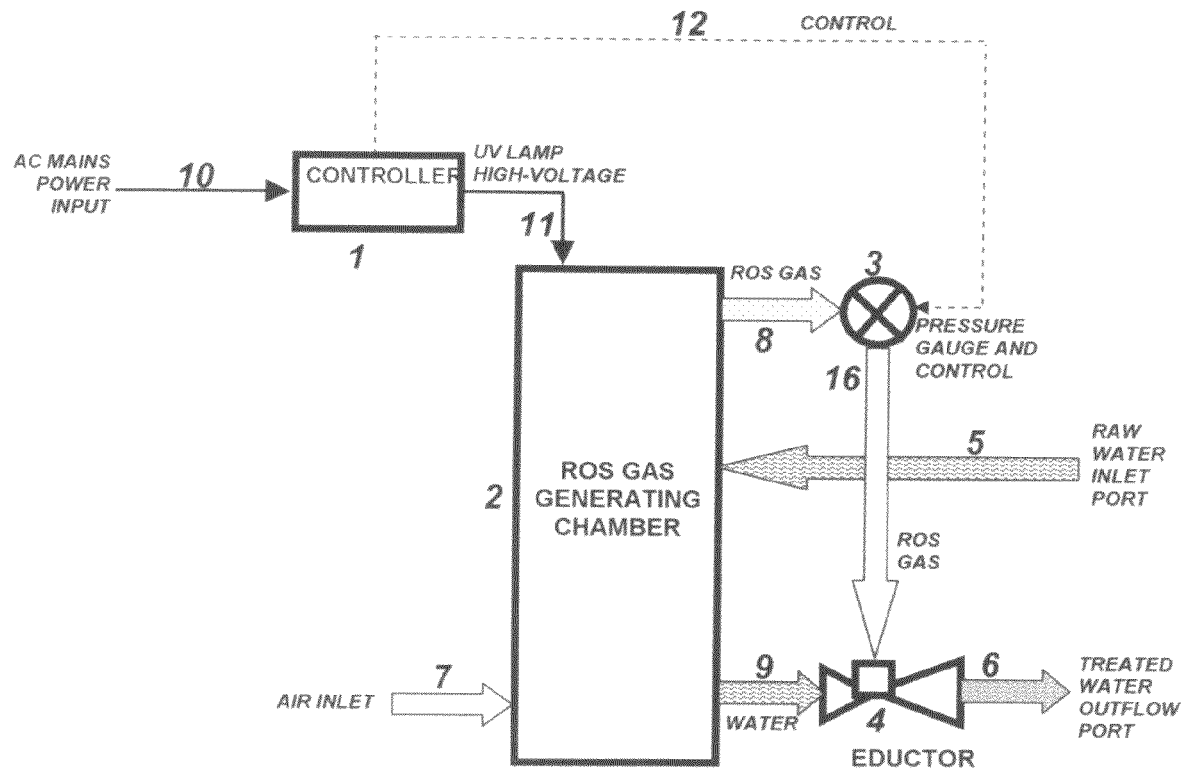
FIG. 1 is a diagram depicting one embodiment of apparatus of the invention, and process.
Figure 2:
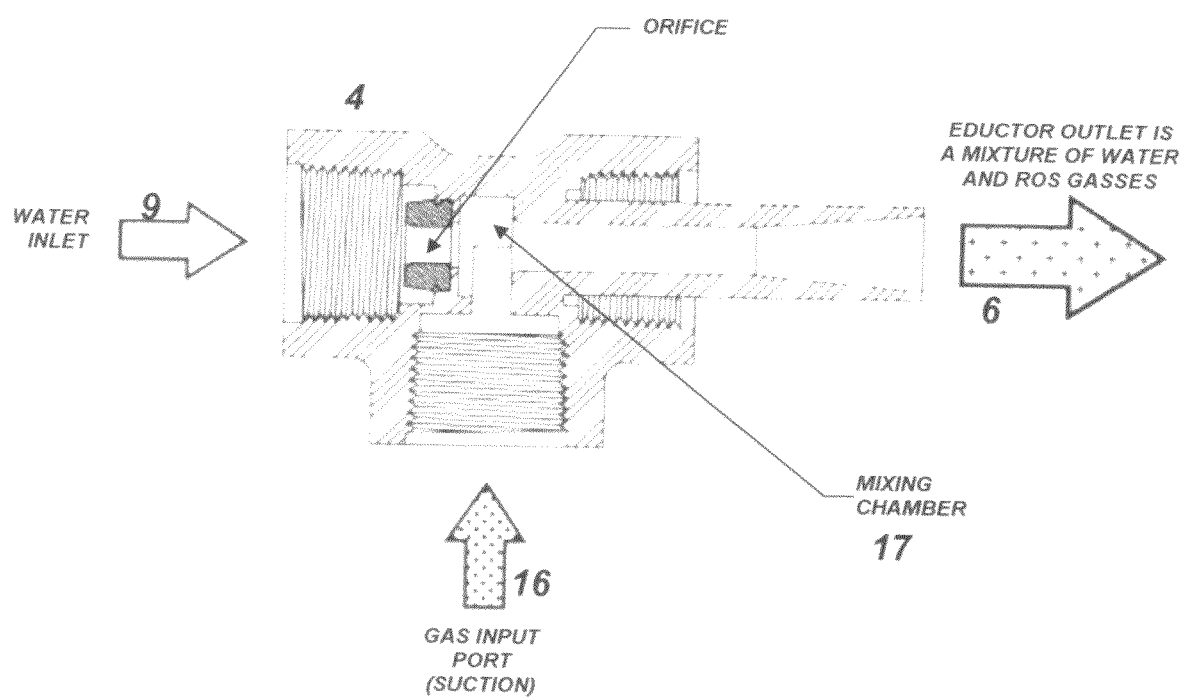
FIG. 2 is a diagram depicting the details of an eductor.

FIG. 1 depicts both apparatus and process flow. The apparatus can be described as divided into three major sections, a controller, a chamber for generating the ROS and an eductor for mixing.

Controller 1 accepts an AC mains line voltage 10 and is used to switch on one or more ultraviolet (UV) 13 lamps contained within an ROS gas generating chamber 2. There are provisions to monitor current for verification of correct operation included in controller 1, as well as switches to energize individual ballasts, which acts as voltage step-up transformers to generate high voltage to the UV lamps 13 in chamber 2 via high voltage line 11. Preferably, each ballast is used to power a single ultraviolet lamp. Please note that while the inventive embodiment is described in detail utilizing UV lamps 13 as the UV source for generating the ROS gas, the invention may utilize any source of available UV light for the processing, without deviating from the scope of the invention.

The controller also contains a flow meter and flow control adjustment 3 in order to regulate the ROS gas-water mixture, and an hour meter 12 in order to gauge the aging of the UV lamp(s) so that they can be replaced at the end of their life. The effective end of life of an UV lamp is defined as that point in time at which the UV radiation is insufficient to maintain proper anti-microbial and anti-scale activities, as the invention intends. The effective life of the UV lamp or UV components is defined by the manufacturer, for example, 10,000 hours, and varies from source to source. There is a switchable ammeter that may be used to monitor lamp or LED current, the overall accumulation of which is related to performance and end of life notification.

A device called an eductor 4 accepts water flow in and directs the water through a venturi-type orifice, which generates a partial vacuum in the internal chamber within the eductor. This partial vacuum sucks in the ROS gasses from the ROS gas generating chamber. The ROS gas generating chamber 2 draws in ambient air from the bottom air inlet 7, which is exposed to ultraviolet radiation from the UV lamps 13 and forms ROS gas. This mixture of ROS gasses outflow from the top of the generator 8 and are sucked into the eductor 4 where they combine with the water inflow. The water/ROS gas mixture emerges from the exhaust port of the eductor 6. Prior to the water entering into the eductor from the eductor inlet 9, it enters through the water inlet 5 and is circulated through a piece of copper tubing 15 within the ROS gas generating chamber. Copper tubing 15 is provided to cool the ROS gasses within that chamber from the thermal buildup caused by the operation of the ultraviolet lamp(s) in a relatively closed environment.

Figure 4:
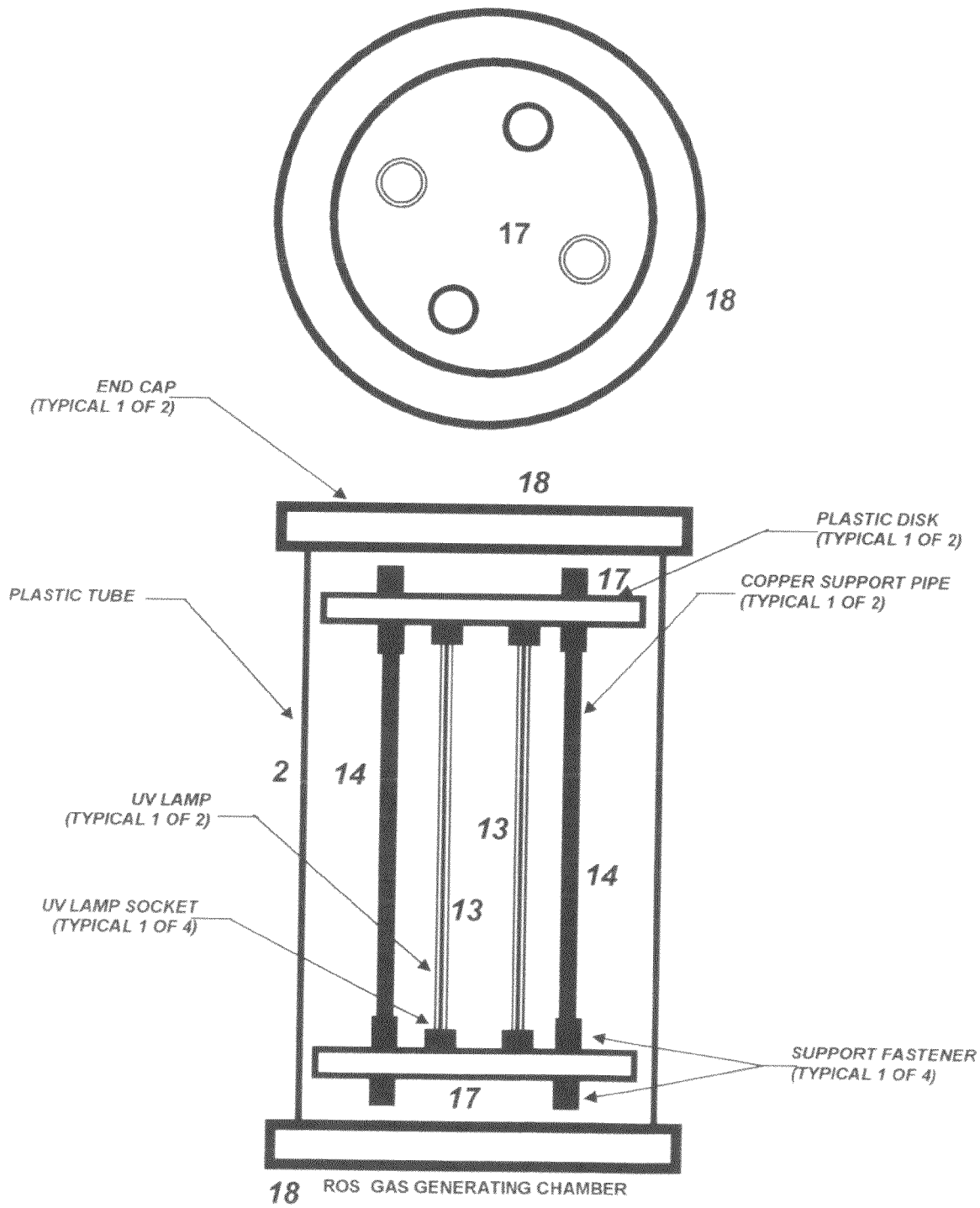
FIG. 4 is a diagram depicting the details of a chamber and UV lamp mounting structure.

The eductor 4, is shown in greater detail in FIG. 4. Eductor 4 has three ports, a water inlet 9, a water outlet 6 and a gas suction input 16. Raw water flows into the inlet port 9. The water flow is constricted through a converging path terminating in an orifice that causes the water velocity and water pressure to rapidly increase within the orifice and rapidly decrease where it exits the orifice into a mixing chamber. The outlet of rapidly flowing water from this orifice causes a decrease in the pressure within the mixing port 17, as a result of the Bernoulli Principle. This reduction in pressure forms a partial vacuum which generates suction in the ROS gas input port, causing ROS gas to be drawn in. The ROS gas enters 16 and combines with the water flowing in the mixing port and exits through the exhaust port outlet 6. Careful design of the internal geometry of the eductor with respect to laminar flow and turbulence controls how well the ROS gas and water mix, and how well a vacuum forms. In this design process, it is desired to maximize the mixing of the ROS gas and water and to maintain sufficient vacuum to draw in the ROS gas from the ROS gas generating chamber. The ROS gas pressure can be monitored and adjusted via the pressure gauge and control valve 3.

Figure 3:
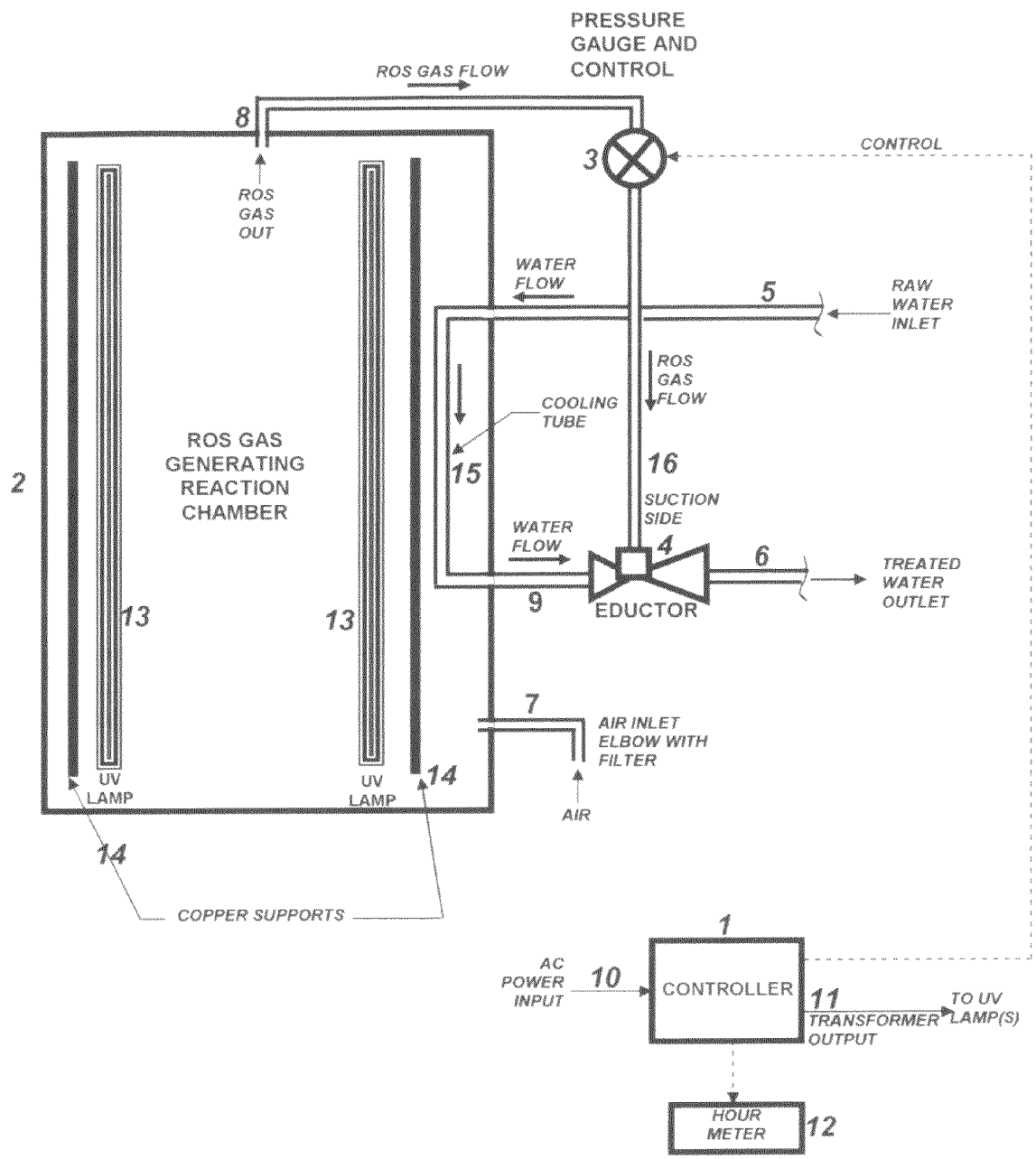
FIG. 3 is a diagram depicting the FIG. 1 embodiment in more detail.

The ROS gas generating chamber 2 is shown in greater detail in FIGS. 3, 4 and 4A. ROS gas generating chamber 2 is cylindrical in structure, constructed of a thick plastic pipe that is capped on both ends 18. The chamber 2 contains the ultraviolet lighting lamps(s) 13 that are similar in structure to a common linear fluorescent lamp, except without the white light producing coating inside the clear tube. The clear tube envelope material is chosen to maximize transmission of ultraviolet light. In this process, preferably a light source of 185 nanometers wavelength is used, but the invention is not limited thereto. For that matter, while the figures show two UV lamps 13, and controller 1 is described as driving same number, the number is provided for exemplary purposes and the invention may be practiced with any number of UV lamps without deviating from the scope and spirit of the invention.

When sufficient voltage is applied to the lamps, they emit a rich source of ultraviolet radiation. In addition, they generate heat. Within the chamber 2, copper cooling tube 15 contains flowing water that is then piped to the eductor 4. The cooling tube 15 and water flow therein, not only supplies water to the eductor for mixing with the ROS gasses, but the same water flow allows for the heat within the chamber 2 to be reduced by transferring it to the water. That is, the chamber's heat, suspended in the ROS gas, is transferred by conduction through the wall of the copper cooling tube 15 and then conductively transferred to the water, which carries the heat out.

Preferably, the lamp(s) are mounted in between lamp socket(s) bolted to circular disks 17 (see FIG. 4). There is a disk 17 at the top and bottom ends 18 of the chamber (FIGS. 4 and 4A). The disks 17 are preferably made from plastic or a suitable insulating material. This process may be performed with one or more UV sources 13 depending on the volume of water flow. The two disks 17 are separated by two sealed copper tubes 14 and maintain a space sufficient for clearance for the ultraviolet lamps. FIG. 4 shows the structure of the disks 17, lamp(s) 17 and copper tubes 14. FIG. 4A depicts one of disks 17 for placement at either chamber end 18. On the side bottom of the ROS gas generating chamber is a short copper elbow that allows outside filtered air to enter 7. On the top of the chamber 2 is a ROS gas exhaust port 8 that is connected via tubing to the eductor 4 after it flows through a flow meter equipped with a flow regulating valve 3.

The presence of ultraviolet radiation in a chamber of air (i.e., ROS gas generating chamber 2) causes the formation (from the air) of a number of gaseous components known as "Reactive Oxygen Species" (ROS). The ROS gasses referred to above are mixed with air. The following gasses are some of the components of this ROS gas mixture: "Super Oxide ($O_2^-$)", "Peroxide (—$O_2$—)", "Hydroperoxide ($HO_2^-$)", "Hydroxyl Radicals ($OH^.$)", "Ozone ($O_3^-$)" and "Molecular Oxygen ($O_2$)". The addition and mixture of ROS gasses with water is the core mechanism for this inventive process. The presence of copper (a metallic element above a certain atomic weight) in the form of the support rods and cooling tube catalyze this reaction.

The foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention. It is further known that other modifications may be made to the present invention, without departing the scope of the invention, as noted in the appended claims.

The invention claimed is:

1. A water treatment apparatus for generating treated water that minimizes scaling in water conduits or containers in which the treated water is used, comprising:
   a chamber including at least one ultraviolet light source for processing ambient air to generate an output flow mixture of air and reactive oxygen species (ROS) gasses;
   a pressure gauge and control;
   a controller in communication with the pressure gauge and control and configured for controlling the at least one ultraviolet lamp, a flow rate of the output flow mixture and an ROS gas ratio in the output flow mixture;
   wherein said pressure gauge and control meters and adjusts the output flow mixture, and
   an eductor for mixing a water flow with the output flow mixture to realize a water/ROS gas mixture with a controlled ratio of ROS gas to water that is output as the treated water.

2. The water treatment apparatus as set forth in claim 1, wherein the eductor operates in cooperation with the controller to control the treated water characteristics, including the ROS gas content and ratio in the treated water.

3. The water treatment apparatus as set forth in claim 1, wherein said eductor further comprises a water inlet to a venturi type orifice, a mixing chamber in fluid flow with the orifice and with an ambient air inlet and an eductor outlet for the treated water.

4. The water treatment apparatus as set forth in claim 1, wherein said controller operates as a step-up transformer to effectively control the processing of the ambient air to generate the output flow mixture.

5. The water treatment apparatus as set forth in claim 1, wherein said chamber further comprises an hour meter to track the hours that each of said at least one ultraviolet light source is operational.

6. The water treatment apparatus as set forth in claim 1, wherein said chamber further comprises copper to catalyze the processing of the ambient air to generate the output flow mixture.

7. The water treatment apparatus as set forth in claim 6, wherein said copper comprises at least one support structure.

8. The water treatment apparatus as set forth in claim 1, wherein said chamber comprises water tubing that allows for a flow of water through the chamber to remove heat from and thereby cool the chamber.

9. The water treatment apparatus as set forth in claim 8, wherein said water tubing provides the flow of water to said eductor.

10. The water treatment apparatus as set forth in claim 8, wherein said water tubing provides the flow of water to said eductor.

11. The water treatment apparatus as set forth in claim 10, wherein said water tubing is made of copper or other suitable catalytic material.

12. The water treatment apparatus as set forth in claim 1, wherein said reactive oxygen species (ROS) gasses include at least one of Super Oxide ($O_2^-$), Peroxide (—$O_2$—), Hydroperoxide ($HO_2^-$), Hydroxyl Radicals ($OH^.$), Ozone ($O_3^-$) and Molecular Oxygen ($O_2$).

13. An heating, ventilation and conditioning (HVAC.) system including a water supply inlet and water treatment apparatus for generating treated water that minimizes scaling in fluid communication with said water supply inlet, the water treatment apparatus comprising:
   a chamber including at least one ultraviolet light source for processing ambient air to generate an output flow mixture of air and reactive oxygen species (ROS) gasses;
   a pressure gauge and control;
   a controller in communication with the pressure gauge and control and configured for controlling the at least one ultraviolet light source, a flow rate of the output flow mixture and an ROS gas ratio in the output flow mixture;
   wherein said pressure gauge and control meters and adjusts the output flow mixture, and an eductor for mixing a water flow with the output flow mixture to realize a water/ROS gas mixture with a controlled ratio of ROS gas to water that is output as the treated water.

14. The heating, ventilation and conditioning (HVAC) system as set forth in claim 13 configured as an open cooling tower system.

15. The heating, ventilation and conditioning (HVAC) system as set forth in claim 13 configured as a closed heating and cooling system for use in commercial, industrial and residential buildings and dwellings.

16. The heating, ventilation and conditioning (HVAC) system as set forth in claim 13 configured as a closed heating and cooling system for use in industrial and commercial electrical power generation.

17. A method of treating water that minimizes scaling in water conduits or containers in which the treated water is used, comprising:
   processing ambient air in a chamber including at least one ultraviolet light source to generate an output flow mixture of air and reactive oxygen species (ROS) gasses;
   using a controller in communication with a pressure gauge and control, and used for controlling the at least one ultraviolet light source, a flow rate of the output flow mixture and an ROS gas ratio in the output flow mixture;
   wherein said pressure gauge and control meters and adjusts the output flow mixture,
   mixing a water flow with the output flow mixture to realize a flow of water/ROS gas mixture with a controlled ratio of ROS #as to water; and outputting a controlled theflow of water/ROS gas mixture as the treated water.

18. The method as set forth in claim 17, wherein the processing and controlling control the treated water characteristics, including the ROS gas content and ratio in the treated water in cooperate with copper present in the chamber to catalyze the generation of the ROS gasses in the output flow mixture.

19. The method as set forth in claim 17, wherein the processing includes generating reactive oxygen species (ROS)

gasses in the output flow mixture including at least one of Super Oxide ($O_2^-$) Peroxide ($—O_2—$), Hydroperoxide ($HO_2^-$), Hydroxyl Radicals ($OH^·$), Ozone ($O_3^-$) and Molecular Oxygen ($O_2$).

\* \* \* \* \*